(12) United States Patent
Hayashi et al.

(10) Patent No.: US 6,352,298 B1
(45) Date of Patent: Mar. 5, 2002

(54) LUGGAGE PANEL OPENING AND CLOSING DEVICE

(75) Inventors: Kenichiro Hayashi, Okazaki; Fumiho Nishi, Chiryu; Katsuaki Kadoike, Kariya; Noriaki Nakatomi, Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/688,691

(22) Filed: Oct. 17, 2000

(30) Foreign Application Priority Data

Oct. 19, 1999 (JP) .......................................... 11-297426

(51) Int. Cl.[7] ................................................. B60J 7/08
(52) U.S. Cl. .................................. 296/107.08; 296/136
(58) Field of Search ............................ 296/107.08, 136, 296/76, 107.07

(56) References Cited

U.S. PATENT DOCUMENTS

| 6,019,417 A | * | 2/2000 | Harerl | 296/107.08 X |
| 6,164,713 A | * | 12/2000 | Graf et al. | 296/107.08 |
| 6,186,577 B1 | * | 2/2001 | Guckel et al. | 296/107.08 X |

FOREIGN PATENT DOCUMENTS

| DE | 44 46 483 | 6/1996 |
| JP | 8-230484 | 9/1996 |

* cited by examiner

Primary Examiner—Joseph D. Pape
(74) Attorney, Agent, or Firm—Burns, Doane, Swecker & Mathis, LLP

(57) ABSTRACT

A luggage panel opening and closing device positionable in a front open condition and a rear open condition to permit access to the luggage space includes a support bracket positioned between a vehicle body and a luggage panel, a link member between the luggage panel and the support bracket, and a multiple link mechanism between the support bracket and the vehicle body.

10 Claims, 5 Drawing Sheets

LUGGAGE PANEL OPENING AND CLOSING DEVICE

This application is based on and claims priority under 35 U.S.C. § 119 with respect to Japanese Application No. 11(1999)-297426 filed on Oct. 19, 1999, the entire content of which is incorporated herein by reference.

FIELD OF THE INVENTION

This invention generally relates to convertible automobiles. More particularly, the present invention pertains to a luggage panel opening and closing device for a convertible automobile.

BACKGROUND OF THE INVENTION

A convertible automobile such as an open-air car capable of housing a roof panel and a rear window in a luggage space is known. FIGS. 5(a)–(e) illustrate a sequence of movements involving a roof panel 1, a rear window 2, a package tray 3, and a luggage panel 4 for converting the automobile from the closed top condition shown in FIG. 5(a) to the open top condition shown in FIG. 5(e) to result in an open air car.

FIG. 5(a) shows the condition of the roof panel 1 and the rear window 2 in the closed position. To convert the vehicle to the open-air condition shown in FIG. 5(e), the rear window 2 is rotated to an upright position and is then pulled or driven downwardly toward the rear direction. The roof panel 1 connected to the rear window 2 is moved in the rearward direction while maintaining the horizontal position. In conjunction with these movements of the roof panel 1 and the rear window 2, the luggage panel 4 is rotated about a pivot axis 5 in the clockwise direction to position the luggage panel 4 in a front open condition shown in FIG. 5(b). Further rearward and downward movement of the rear window 2 could cause interference between the package tray 3 and the rearward moving roof panel 1 if the package tray 3 is maintained in the position shown in FIG. 5(b). Accordingly, the package tray 3 is rotated in the counter-clockwise direction as shown in FIG. 5(c) towards an upright position to avoid such interference between the package tray 3 and the roof panel 1.

In the condition shown in FIG. 5(c), the roof panel 1 and the rear window 2 are partially housed in the luggage space or trunk 6. Further rearward and downward movement of the rear window 2 causes the roof panel 1 and the rear window 2 to reach the condition shown in FIG. 5(d) in which the roof panel 1 and the rear window 2 are completely housed in the luggage space 6. As shown in FIG. 5(d), a slide board portion 7 of the package tray 3 is pulled or moved in the rearward direction. After confirming the complete housing of the roof panel 1 and the rear window 2 in the luggage space 6, the luggage panel 4 is pivoted counter-clockwise and completely closed as illustrated in FIG. 5(e).

To move the roof panel from the completely open condition to the completely closed condition, a reverse order of movements to that described above is carried out. To place luggage in the luggage space 6 when the roof assembly is in the completely closed condition shown in FIG. 5(a), the lock associated with the luggage panel 4 is unlocked and the rear portion of the luggage panel 4 is lifted by hand.

Japan Patent Laid-Open Publication No. H08-230484 (published on Sep. 10, 1996) describes the movement or motion of the roof panel and the luggage panel, while German Patent Specification No. DE 4446483 discloses the movement or motion of the package tray. As disclosed in the Japanese document, a U-shaped auxiliary frame is provided in the luggage space at the rear portion of the vehicle, a support plate is fixed on an end portion of the opposed leg portions of the auxiliary frame, the luggage panel is supported by the support plate via a rocking parallelogram link mechanism, and the rear portion of the luggage panel can be opened by this link mechanism to the rear open condition. To open the luggage panel to the front open condition, a support pipe of the auxiliary frame extending in the vehicle widthwise direction serves as a rotation axis and the luggage panel is rotated along with the support plate and the rocking parallelogram by the assistance of hydraulic pressure of a hydraulic pressure cylinder. In this case, the rear portion of the luggage panel is locked to the support pipe of the auxiliary frame by a lock device.

However, this known luggage panel opening and closing device suffers from certain disadvantages and drawbacks. Because the U-shaped auxiliary frame is provided in the luggage space for opening and closing the luggage panel, the width of the luggage space is limited to the width between the opposed leg portions of the auxiliary frame. Also, the opposed leg portions and the support plate require sufficient strength for enduring the weight of the luggage panel and the integral rocking around the support pipe of the auxiliary frame, and so the weight of these elements tends to be increased.

In light of the foregoing, a need exists for a luggage panel opening and closing device capable of achieving a front open condition and a rear open condition for permitting access to the luggage space, yet which is not as susceptible to the disadvantages mentioned above.

SUMMARY OF THE INVENTION

The luggage panel opening and closing device of the present invention includes a support bracket rotatable about a pivotal center of a pivot axis of the luggage panel provided on the rear portion of the vehicle. The support bracket is supported by the vehicle body via a multiple link mechanism and supports the luggage panel by way of a link member.

With this construction, the front open condition of the luggage panel is achieved by the multiple link mechanism between the support bracket and the vehicle body and a rear open condition of the luggage panel is achieved by a link member between the luggage panel and the support bracket.

According to one aspect of the invention, a luggage panel opening and closing device covering the luggage space in the rear portion of a vehicle and positionable in a front open condition and a rear open condition includes a multiple link mechanism including a main arm accommodated at least at one side of the luggage space and a sub arm supported to the main arm so as to cross over the main arm, a support bracket operatively connected with the multiple link mechanism, a link member connecting the support bracket and the luggage panel, and a motor for actuating the main arm of the multiple link mechanism to enable the front open condition of the luggage panel.

According to another aspect of the invention, a luggage panel opening and closing device that is mounted on a vehicle to cover a luggage space in a rear portion of a vehicle and positionable in a front open condition and a rear open condition to permit access to the luggage space includes a multiple link mechanism including a main arm accommodated at least at one side of the luggage space. The multiple link mechanism is movable to an operating condition to produce the front open condition of the luggage panel and is maintained at a non-operating condition as the luggage panel is moved to the rear open condition. A support bracket is connected to the multiple link mechanism and a link member connects the support bracket and the luggage panel. The link member is movable to an operating condition upon movement of the luggage panel to the rear open condition and is maintained at a non-operating condition as the luggage panel is moved to the front open condition. A motor actuates the main arm of the multiple link mechanism to move the luggage panel to the front open condition.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

The luggage panel opening and closing device of the present invention is adapted to open and close a luggage panel (trunk lid) of an automobile. The luggage panel is movable to a front open condition or position in which the front portion of the luggage panel is open to permit access to the luggage space (trunk) for purposes of housing or stowing the convertible roof and to a rear open position or condition in which the rear portion of the luggage panel is open to permit access to the luggage space for purposes of stowing luggage or other items.

Figure 1:
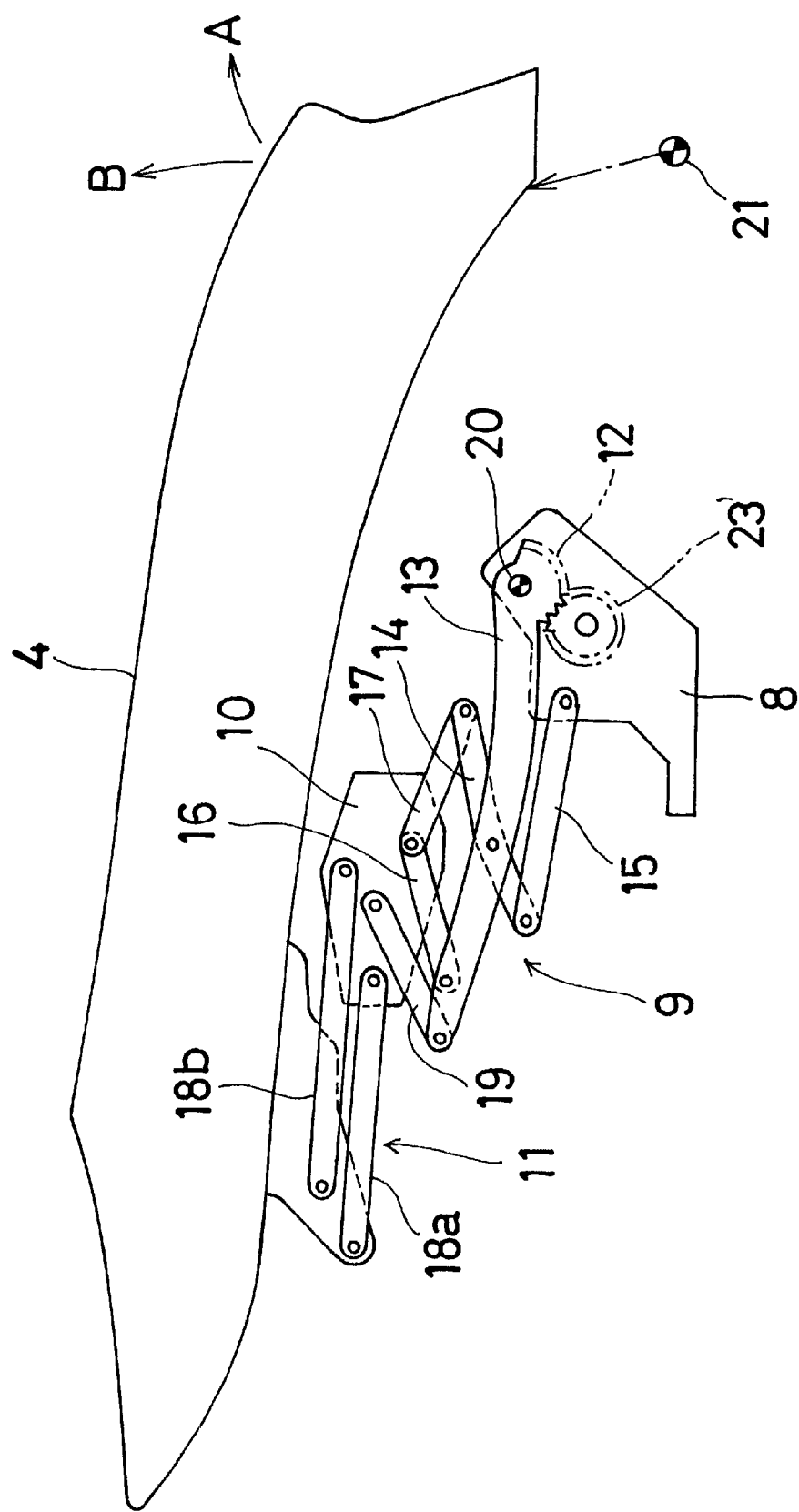
FIG. 1 is a side view showing the basic structure of the luggage panel opening and closing device of the present invention.
Figure 2:
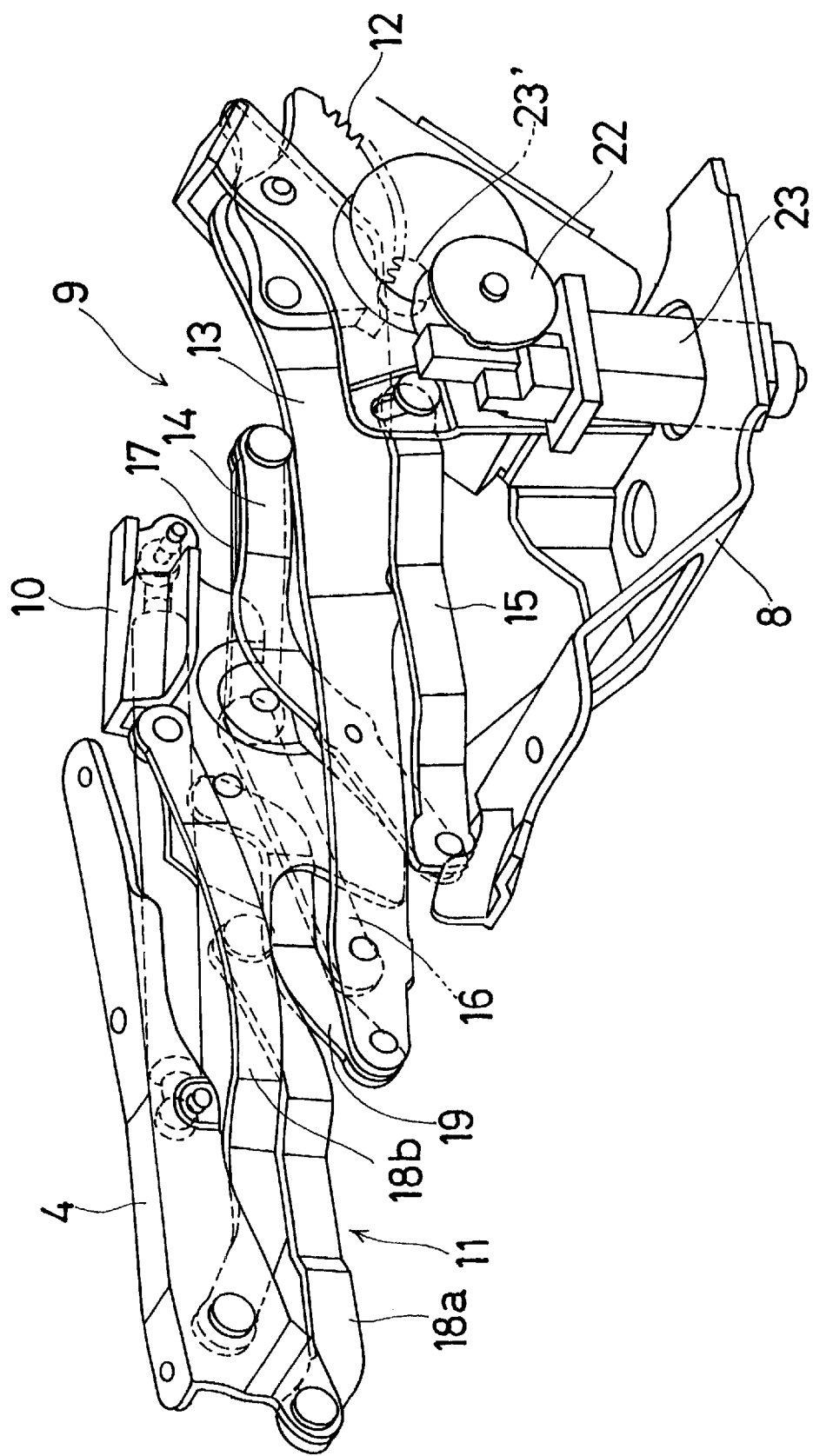
FIG. 2 is a perspective view of the luggage panel opening and closing device shown in FIG. 1.

Referring initially to FIGS. 1 and 2, the luggage panel opening and closing device of the present invention for operating the luggage panel 4 includes a motor 23 operatively associated with a main arm 13. The driving output from the motor 23 is transmitted to the driving gear 23' via a deceleration gear device 22 and provides a force to rotate the main arm 13 for opening or closing the front portion of the luggage panel 4 to achieve the front open and rear open conditions.

The luggage panel opening and closing device also includes a multiple link mechanism 9, a support bracket 10 and a link member 11 that are disposed between the luggage panel 4 and the vehicle body 8. The multiple link mechanism 9 includes the main arm 13 and a sub arm 14 that is pivotally supported with respect to the main arm 13 in a crossing manner. One end of the main arm 13 is provided with a driven gear 12.

The multiple link mechanism 9 is defined by a first auxiliary link 15 linking the sub arm 14 and the vehicle body 8, a second auxiliary link 16 linking the main arm 13 and the support bracket 10, a third auxiliary link 17 linking the sub arm 14 and the support bracket 10, to form a generally parallel link portion. The other end of the main arm 13 is linked to the support bracket 10 through a further auxiliary link 19 arranged generally parallel to the second auxiliary link 16.

The link member 11 includes two links 18a, 18b arranged in parallel to each other. Each of the links 18a, 18b is connected to the support bracket 10 and the luggage panel 4.

The driven gear 12 located at one end of the main arm 13 is engaged with the driving gear 23' of an output shaft of the motor 23 that is supported by the vehicle body 8. When the motor 23 is actuated, the main arm 13 is rotated in the clockwise direction around a first pivot axis 20 which rotatably supports the main arm 13 with respect to the vehicle body 8. This rotational movement of the main arm 13 rotates the luggage panel 4 in the direction of the arrow A shown in FIG. 1 around a second pivotal axis 21 (which is an imaginary pivot axis) via the link member 11 and the multiple link mechanism 9. Accordingly, the front open condition of the luggage panel 4 is achieved. To close the luggage panel 4, the motor is driven in the reverse direction.

The rear open condition of the luggage panel is achieved by releasing a lock device between the luggage panel 4 and the vehicle body 8, and manually lifting the rear portion of the luggage panel 4 in the direction of the arrow B in FIG. 1 to permit the link member 11 to stand upright relative to the stationary support bracket 10.

Figure 3:
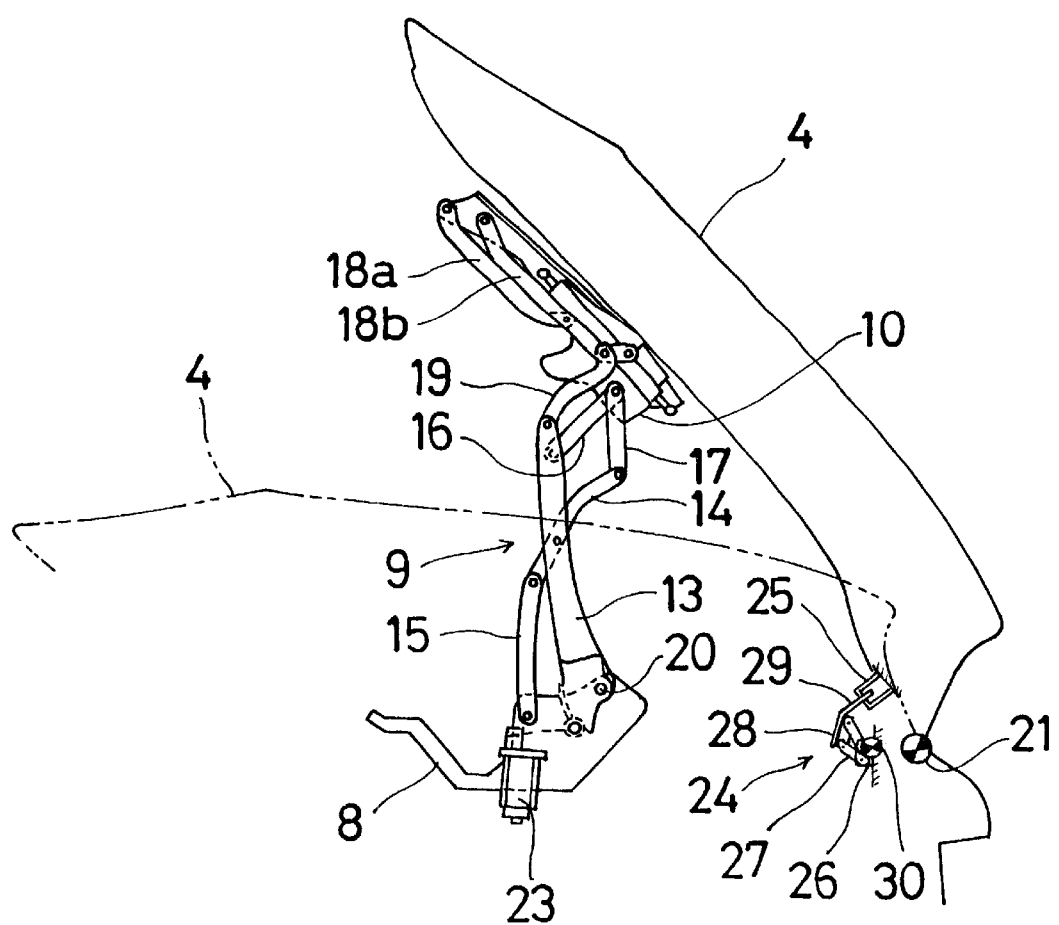
FIG. 3 is a side view of the luggage panel opening and closing device illustrating the front open condition.

The lock device 24 includes a striker 25 on the luggage panel 4 side and a latch 29 fixed to a rocking bracket 28 rotatably supported by a fixed bracket 26 on the vehicle body 8 side via a parallel link 27. The opening or closing of the luggage panel 4 under the front open condition can be achieved without releasing the engagement between the striker 25 and the latch 29 because the rocking bracket 28 is rotated around the second pivot axis 21 as a pivot center when opening or closing the front portion of the luggage panel 4. The second pivot axis 21 is also the rotation center of a support bracket 10. The second pivot axis 21 is located rearwardly of the lock device 24 when the luggage panel 4 is positioned in the front open position FIG. 3 shows the front open condition of the luggage panel 4 in which the front portion of the luggage panel (i.e., the portion facing towards the front of the vehicle) is raised. When the main arm 13 is rotated in the clockwise direction around the first pivot axis 20 as described above, the luggage panel 4 is lifted and rotated in the clockwise direction around the second pivot axis 21 by the multiple link mechanism 9 to open the front portion of the luggage panel 4. The luggage panel 4 is locked to the vehicle body 8 by the lock device 24 while the front portion of the luggage panel 4 is opened.

Figure 4:
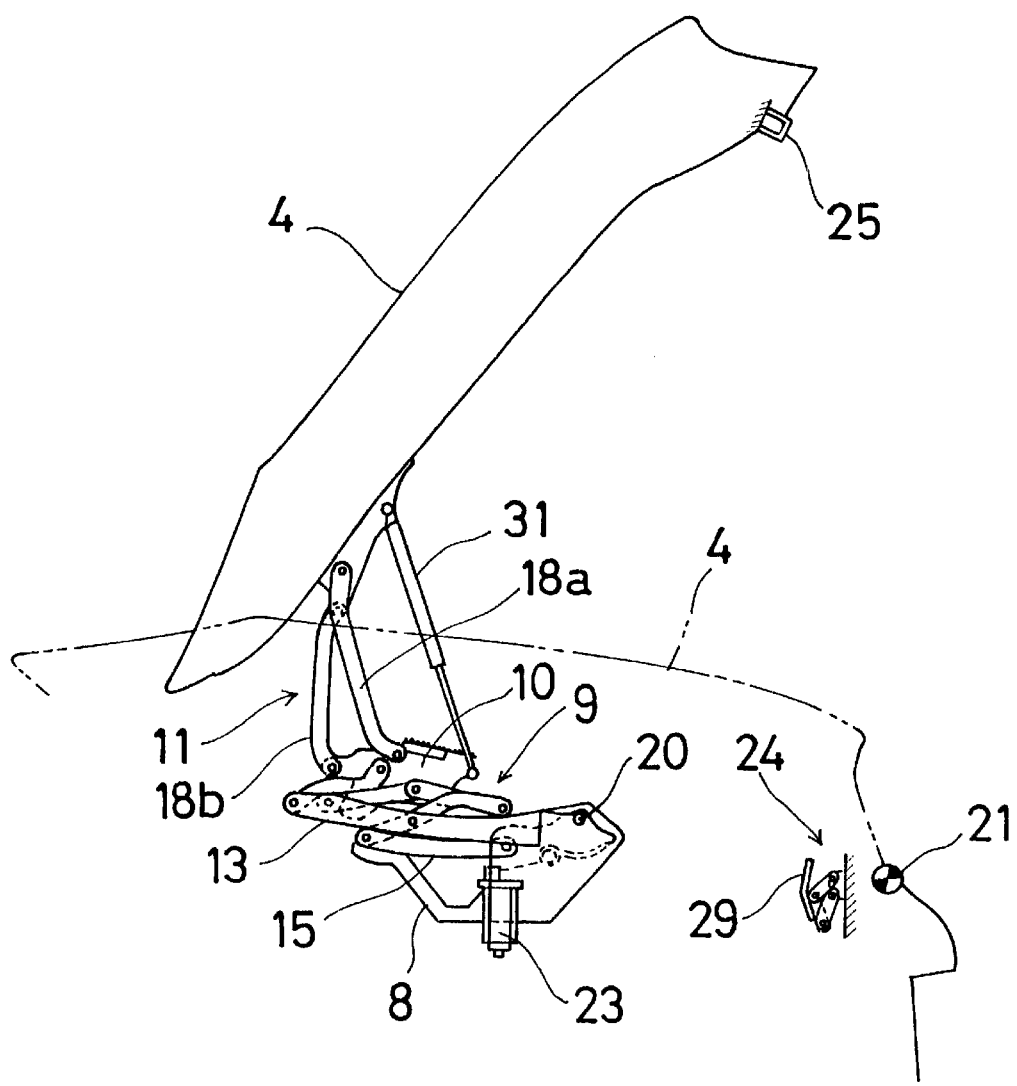
FIG. 4 is a side view of the luggage panel opening and closing device illustrating the rear open condition.
Figure 5:
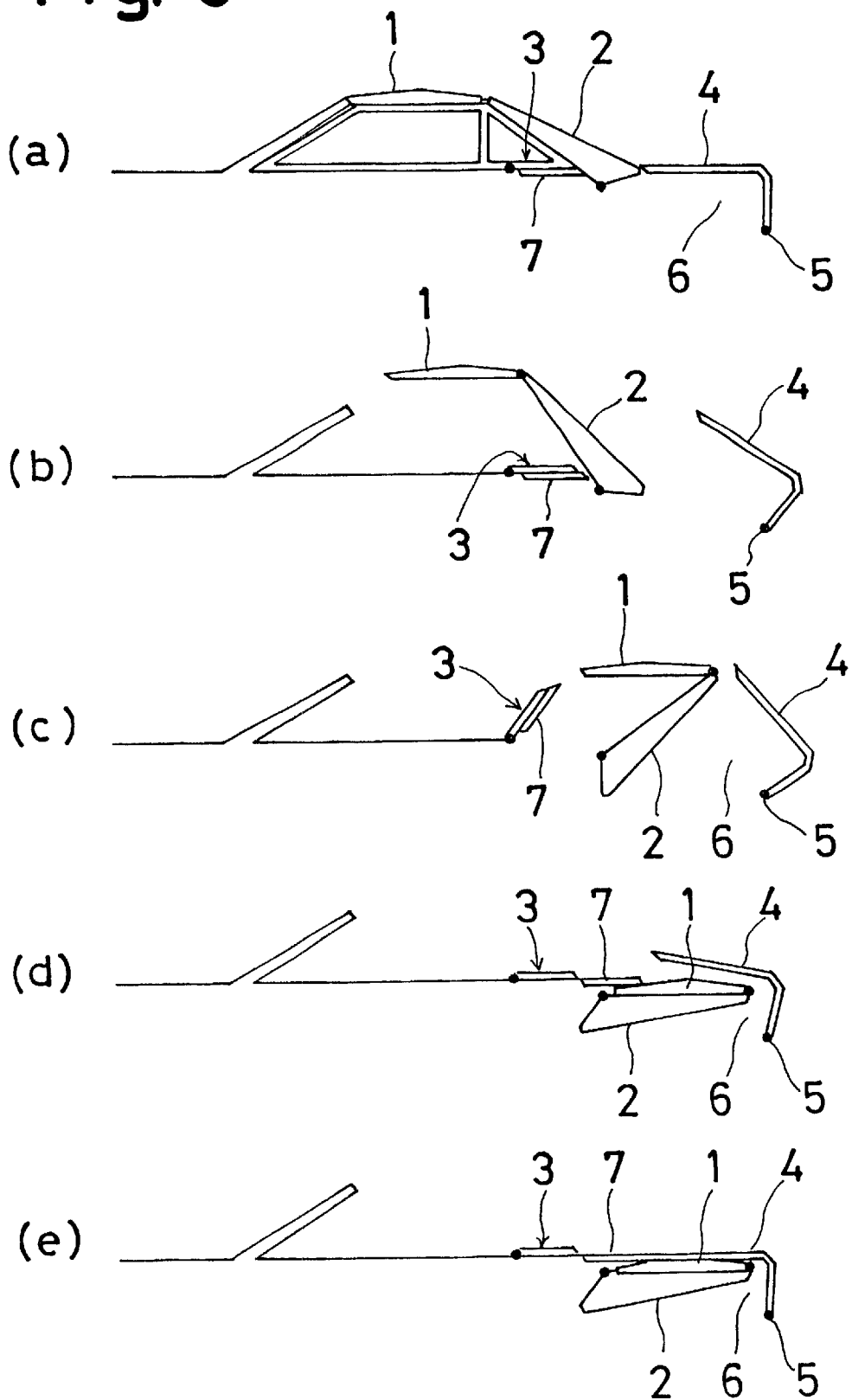
FIGS. 5(a)–(e) are schematic views of a convertible roof assembly showing the motion of the roof panel, rear window, package tray and luggage panel.

The rear open condition of the luggage panel is shown in FIG. 4. The rear open condition of the luggage panel 4 is achieved by releasing the engagement between the striker 25 and the latch 29 by a key or operation lever, and lifting the rear portion of the luggage panel 4. A damper 31 operatively connecting the support bracket 10 and the luggage panel 4 supports the weight of the luggage panel 4 to assist the smooth operation for opening and closing the rear portion of the luggage panel 4.

At the rear open condition of the luggage panel 4, only the link member 11 is extended in the operational condition and stands upright relative to the support bracket 10. The multiple link mechanism 9 is maintained in its non-operation condition as shown in FIG. 4. On the other hand, in the front open condition of the luggage panel 4, the multiple link mechanism 9 is extended in the operational condition while the link member 11 is maintained in its non-operational condition.

The multiple link mechanism 9 can be provided on one side of the luggage panel 4 and is accommodated in at least one side of the luggage space, which does not occupy a large space of the luggage space.

Although the second pivot axis 21 is defined as the rotation center of the rocking bracket 28 of the lock mechanism 24 in this embodiment of this invention, a fulcrum point 30 (shown in FIG. 3) in the lock mechanism 24 can be utilized. In this case, an absorbing mechanism absorbing the difference in locus between the rocking bracket 28 and the support bracket 10 is additionally required for the luggage panel 4.

The principles, preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening and closing device for a luggage panel covering a luggage space in a rear portion of a vehicle and positionable in a front open condition and a rear open condition, comprising:
    a multiple link mechanism including a main arm accommodated at least at one side of the luggage space and a sub arm supported relative to the main arm so as to cross over the main arm;
    a support bracket operatively connected with the multiple link mechanism;
    a link member connecting the support bracket and the luggage panel; and
    a motor for actuating the main arm of the multiple link mechanism to enable the front open condition of the luggage panel.

2. The opening and closing device according to claim 1, wherein the multiple link mechanism further includes one auxiliary arm approximately parallel to the main arm for connecting one end portion of the sub arm to the body of the vehicle, and another auxiliary arm approximately parallel to the sub arm and connecting the main arm with the support bracket, each of said auxiliary arms forming one side of a parallelogram to form a parallel link portion in the multiple link mechanism.

3. The opening and closing device according to claim 2, wherein a rear portion of the luggage panel is engageable with the body of the vehicle by way of a lock device, and wherein a pivot axis about which the luggage panel pivots when the luggage panel is moving towards the front open condition is positioned rearwardly of the lock device.

4. The opening and closing device according to claim 3, wherein the link member is tilted relative to the support bracket when the luggage panel is lifted to the rear open condition by releasing the lock device.

5. The opening and closing device according to claim 3, wherein the support bracket is rotatable around the pivotal axis by the movement of the multiple link mechanism.

6. An opening and closing device for a luggage panel mounted on a vehicle to cover a luggage space in a rear portion of a vehicle and positionable in a front open condition and a rear open condition to permit access to the luggage space, comprising:
    a multiple link mechanism including a main arm accommodated at least at one side of the luggage space, the multiple link mechanism being movable to an operating condition to produce the front open condition of the luggage panel and being maintained at a non-operating condition as the luggage panel is moved to the rear open condition;
    a support bracket connected to the multiple link mechanism;
    a link member connecting the support bracket and the luggage panel, the link member being movable to an operating condition upon movement of the luggage panel to the rear open condition and being maintained at a non-operating condition as the luggage panel is moved to the front open condition; and
    a motor for actuating the main arm of the multiple link mechanism to move the luggage panel to the front open condition.

7. The opening and closing device according to claim 6, wherein the multiple link mechanism further includes a sub arm, a first auxiliary arm connecting one end portion of the sub arm to the body of the vehicle body and another auxiliary arm connecting the main arm with the support bracket, each of said auxiliary arms forming one side of a parallelogram to form a parallel link portion in the multiple link mechanism.

8. The opening and closing device according to claim 6, wherein a rear portion of the luggage panel is engageable with the body of the vehicle by way of a lock device, and wherein a pivot axis about which the luggage panel pivots when the luggage panel is moving towards the front open condition is positioned rearwardly of the lock device.

9. The opening and closing device according to claim 8, wherein the link member is tilted relative to the support bracket when the luggage panel is lifted to the rear open condition by releasing the lock device.

10. The opening and closing device according to claim 8, wherein the support bracket is rotatable around the pivot axis by movement of the multiple link mechanism.

* * * * *